(12) United States Patent
Miyao

(10) Patent No.: US 11,934,061 B2
(45) Date of Patent: Mar. 19, 2024

(54) DISPLAY APPARATUS

(71) Applicant: Japan Display Inc., Tokyo (JP)

(72) Inventor: Makoto Miyao, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/883,606

(22) Filed: Aug. 9, 2022

(65) Prior Publication Data
US 2023/0047925 A1 Feb. 16, 2023

(30) Foreign Application Priority Data
Aug. 10, 2021 (JP) ................. 2021-130735

(51) Int. Cl.
*G02F 1/1333* (2006.01)
*G02F 1/13357* (2006.01)

(52) U.S. Cl.
CPC .. *G02F 1/133382* (2013.01); *G02F 1/133331* (2021.01); *G02F 1/133603* (2013.01); *G02F 1/133615* (2013.01)

(58) Field of Classification Search
CPC ......... G02F 1/133331; G02F 1/133615; G02F 1/133382
See application file for complete search history.

(56) References Cited

U.S. PATENT DOCUMENTS

2008/0117361 A1* 5/2008 Chun ............... G02F 1/133382
  349/65
2021/0096406 A1* 4/2021 Miyao ............... G02F 1/133615

FOREIGN PATENT DOCUMENTS

| JP | 2015-72306 A | | 4/2015 |
| JP | 2015072306 A | * | 4/2015 |
| JP | 2016210638 A | * | 12/2016 |
| KR | 20170071824 A | * | 6/2017 |
| WO | WO-2019239860 A1 | * | 12/2019 ....... G02F 1/133302 |

* cited by examiner

*Primary Examiner* — Jia X Pan
(74) *Attorney, Agent, or Firm* — XSENSUS LLP

(57) ABSTRACT

A performance of a display apparatus is improved. A display apparatus includes a glass plate, a display panel facing the glass plate, a frame housing a part of the glass plate and a part of the display panel, and a light source module housed in the frame. The glass plate has a side surface. The display panel includes a first substrate facing the glass plate, a second substrate facing the first substrate, and a liquid crystal layer located between the first substrate and the second substrate. The light source module is disposed at a position facing the side surface of the glass plate.

3 Claims, 11 Drawing Sheets

DISPLAY APPARATUS

CROSS-REFERENCE TO RELATED APPLICATION

The present application claims priority to Japanese Patent Application No. 2021-130735 filed on Aug. 10, 2021, the disclosure of which is incorporated herein by reference.

TECHNICAL FIELD OF THE INVENTION

The present invention relates to a display apparatus.

BACKGROUND OF THE INVENTION

Japanese Patent Application Laid-Open Publication No. 2015-72306 (Patent Document 1) discloses a display apparatus including a transparent display built inside a window glass for a rail vehicle.

RELATED ART DOCUMENT

Patent Document

Patent Document 1: Japanese Patent Application Laid-Open Publication No. 2015-72306

SUMMARY OF THE INVENTION

The inventor of the present application has developed a transparent display apparatus that enables an observer to recognize a display image and a background overlapping with each other. As part of the development of the transparent display apparatus, the present inventor has studied on combination a glass plate such as a window glass and the transparent display apparatus to constitute a display apparatus. From a result of this, it is found out that a simple structure of the combination of the glass plate and the transparent display apparatus has a room for improvement. For example, in the case of the transparent display apparatus, light that can be visually recognized by the observer is emitted to the outside of the display apparatus by introducing the light from a light source module disposed on a side surface of a substrate, and then, scattering the light using a liquid crystal layer. However, if the light source module for the transparent display apparatus is used as it is, there is a problem that makes a display image difficult to see due to low luminance.

An objective of the present invention is to provide a technique that improves a performance of a display apparatus.

A display apparatus according to an aspect of the present invention includes: a first glass plate; a display panel facing the first glass plate; a frame housing a part of the first glass plate and a part of the display panel; and a light source module housed in the frame. The first glass plate has a first surface, a second surface opposite to the first surface, and a first side surface connected to the first surface and the second surface. The display panel includes a first substrate facing the first glass plate, a second substrate facing the first substrate, and a liquid crystal layer located between the first substrate and the second substrate. The light source module is disposed at a position facing the first side surface of the first glass plate.

BRIEF DESCRIPTIONS OF THE DRAWINGS

BEST MODE FOR CARRYING OUT THE INVENTION

Figure 1:
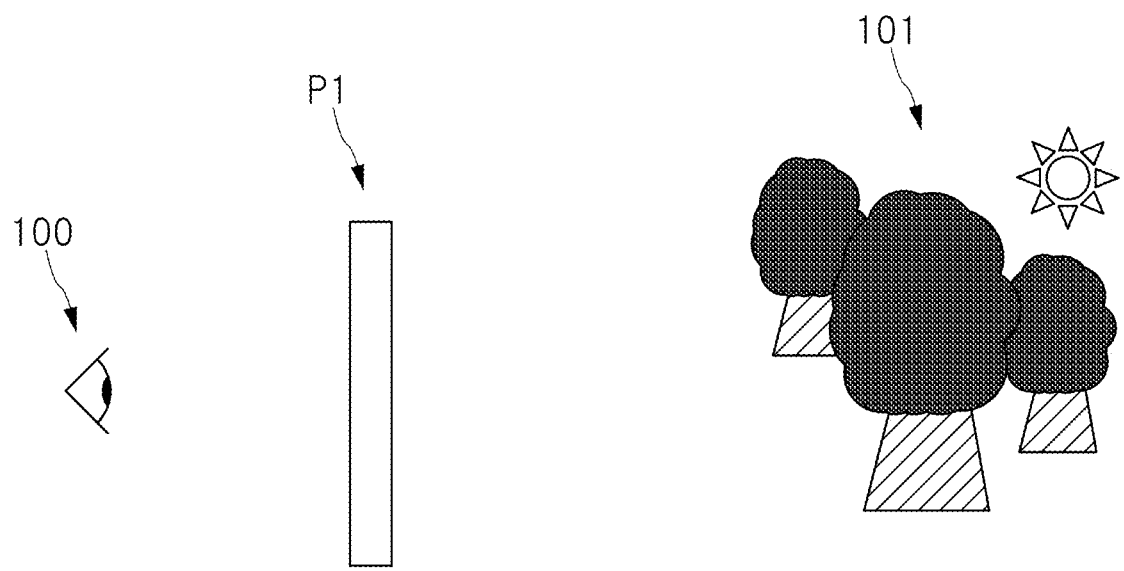
FIG. 1 is an explanatory diagram illustrating a positional relationship caused when a viewer on one surface side of a transparent display panel apparatus visually recognizes a background on the opposite side through the transparent display panel apparatus.

The following is explanation for each embodiment of the present invention with reference to drawings. Note that only one example is disclosed, and appropriate modification with the gist of the present invention which can be easily anticipated by those skilled in the art is obviously within the scope of the present invention. Also, in order to make the clear description, a width, a thickness, a shape, and others of each portion in the drawings are schematically illustrated more than those in an actual aspect in some cases. However, the illustration is only an example, and does not limit the interpretation of the present invention. In the present specification and each drawing, similar elements to those described earlier for the already-described drawings are denoted with the same or similar reference signs, and detailed description for them is appropriately omitted in some cases.

In the following embodiment, a liquid crystal display apparatus that displays an image using scattering of visible light caused by liquid crystal molecules will be explained as an example of a display panel used in combination with a glass plate.

Also, the liquid crystal display apparatus forms a display image by changing orientation of molecules included in a liquid crystal layer, and needs a light source. In the embodiment explained below, the light source is provided separately from the display panel. Thus, in the following explanation, the display panel and a light source module that supplies visible light to the display panel are explained to be distinguished from each other.

<Transparent Display Panel>

Figure 2:
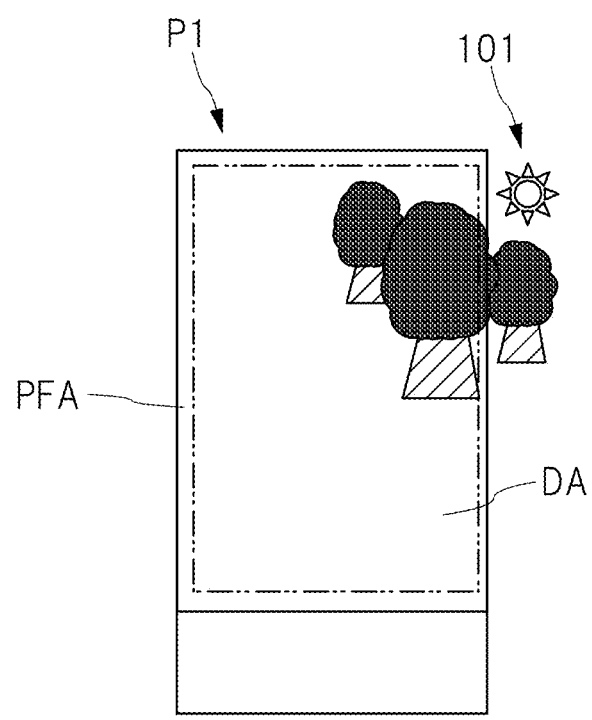
FIG. 2 is an explanatory diagram illustrating an example of the background visually recognized through the transparent display panel apparatus.

First, characteristics of a so-called transparent display panel will be explained. FIG. 1 is an explanatory diagram illustrating a positional relationship caused when a viewer on one surface side of the transparent display panel visually recognizes a background on the opposite side through the transparent display panel. FIG. 2 is an explanatory diagram illustrating an example of the background visually recognized through the transparent display panel.

As illustrated in FIG. 1, when an observer 100 looks at the other side of a display panel P1 from one side of the display panel P1, a background 101 is visually recognized through the display panel P1. As illustrated in FIG. 2, when both a display region DA and a peripheral region PFA outside the display region DA transmit light, the entire background 101 can be visually recognized without uncomfortable feeling. On the other hand, when the peripheral region PFA has a light shielding property that does not transmit the light, this case may provide the observer 100 (see FIG. 1) with the uncomfortable feeling since a part of the background 101 visually recognized through the display panel P1 is blocked by the peripheral region PFA. In this manner, when the display panel P1 is the transparent display panel, each of the display region DA and the peripheral region PFA preferably has a visible-light transmitting property. In addition, in terms of visually recognizing the background 101 without the uncomfortable feeling, it is particularly preferable that the display region DA and the peripheral region PFA have the almost same level of the visible-light transmitting property.

Figure 3:
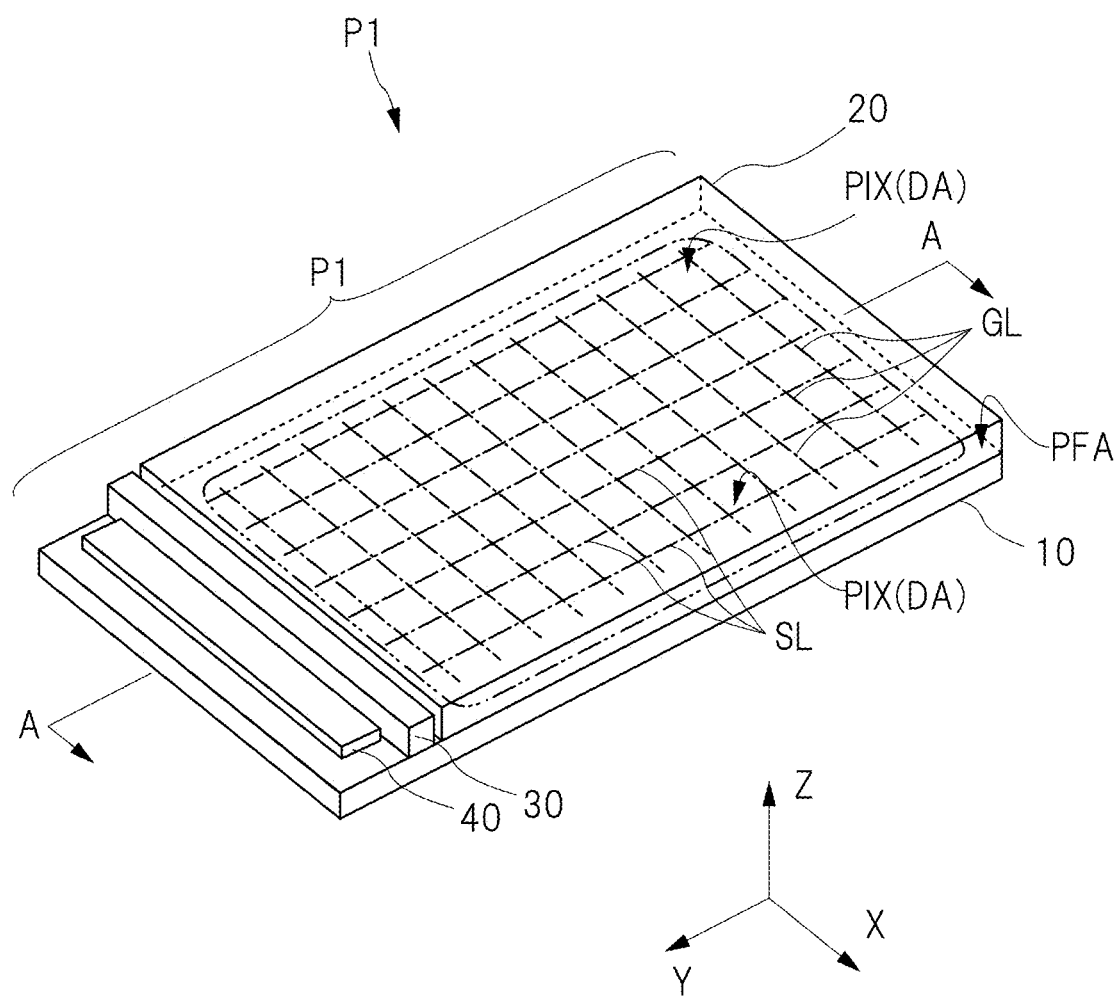
FIG. 3 is a perspective view illustrating an example of the transparent display panel illustrated in FIG. 1.
Figure 4:
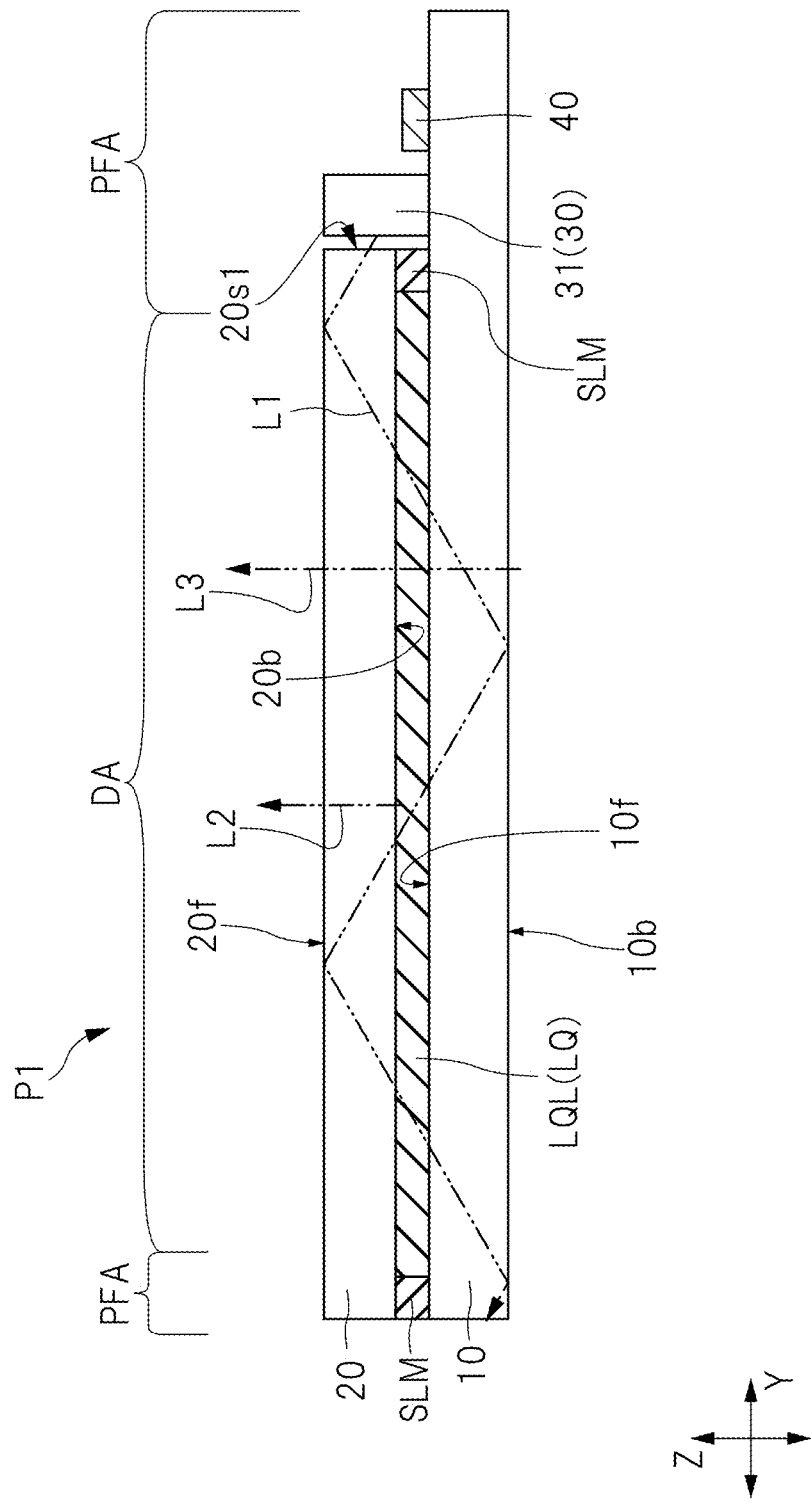
FIG. 4 is a cross-sectional view taken along line A-A of FIG. 3.

FIG. 3 is a perspective view illustrating an example of the transparent display panel illustrated in FIG. 1. In FIG. 3, an interface between the display region DA and the peripheral region PFA is indicated by a dashed double-dotted line. Also, in FIG. 3, some (specifically, a gate line GL and a source line SL) of signal wirings that transmit a signal for driving liquid crystal in a circuit included in the display panel P1 are schematically indicated by a dashed dotted line. In explanation for the following drawings including FIG. 3, a direction along a thickness direction of the display panel P1 is referred to as a Z direction, an extending direction of one side of the display panel P1 on an X-Y plane perpendicular to the Z direction is referred to as an X direction, and a direction intersecting the X direction is referred to as a Y direction. FIG. 4 is a cross-sectional view taken along a line A-A of FIG. 3.

As illustrated in FIG. 3, the display panel P1 of the present embodiment includes a substrate (array substrate) 10, a substrate (opposing substrate) 20, a side light source apparatus 30, and a driving circuit 40. The display panel P1 may include, for example, a control circuit, a flexible board connected to the display panel P1, a housing or others in addition to the parts included in the display panel P1 illustrated in FIG. 3. In FIG. 3, illustration of a part other than the display panel P1 is omitted. The display panel P1 includes the display region DA where an image is formed in response to an input signal fed from the outside, and a peripheral region (frame region) PFA located around the display region DA. Note that, while the display region DA of the display panel P1 illustrated in FIG. 3 has a quadrangular shape, the display region DA may have a shape other than the quadrangular shape, such as a polygonal shape or a circular shape. In plan view in which a display surface is viewed, the display region DA is an effective region where the display panel P1 displays the image. Each of the substrates 10 and 20 is at a position overlapping the display region DA in plan view. Each of the side light source apparatus 30 and the driving circuit 40 is mounted on the substrate 10.

As illustrated in FIG. 4, the display panel P1 includes the substrate 10 and the substrate 20 bonded together to face each other across a liquid crystal layer LQL. The substrate 10 and the substrate 20 are arrayed in the Z direction which is the thickness direction of the display panel P1. In other words, the substrate 10 and the substrate 20 face each other in the thickness direction (Z direction) of the display panel P1. The substrate 10 has a front surface (main surface, surface) 10f facing the liquid crystal layer LQL (and the substrate 20). The substrate 20 has a back surface (main surface, surface) 20b facing the front surface 10f of the substrate 10 (and the liquid crystal layer LQL). The substrate 10 is an array substrate on which a plurality of transistors (transistor elements) serving as switching elements (active elements) Tr (see FIG. 5) are arrayed. The substrate 20 is a substrate provided on the display surface side. The substrate 20 can also be interpreted as an opposing substrate meaning a substrate facing the array substrate.

The liquid crystal layer LQL containing liquid crystal LQ is located between the front surface 10f of the substrate 10 and the back surface 20b of the substrate 20. The liquid crystal layer LQL is an optical modulation element. The display panel P1 has a function of modulating the light passing therethrough by controlling a state of an electric field formed around the liquid crystal layer LQL via the switching elements described above. The display region DA on the substrate 10 and the substrate 20 overlaps the liquid crystal layer LQL as illustrated in FIG. 4.

Also, the substrate 10 and the substrate 20 are bonded to each other so as to put a seal portion (seal member) SLM therebetween. As illustrated in FIGS. 3 and 4, the seal portion SLM (see FIG. 4) is disposed in the peripheral region PFA to surround the display region DA. As illustrated in FIG. 4, the liquid crystal layer LQL is located inside the seal portion SLM. The seal portion SLM plays a role of a seal that seals the liquid crystal between the substrate 10 and the substrate 20. The seal portion SLM also plays a role of an adhesive that bonds the substrate 10 and the substrate 20 together.

The side light source apparatus 30 includes a light source unit 31. The light source unit 31 is disposed at a position facing a side surface 20s1 of the substrate 20. As schematically indicated by a dashed double-dotted line in FIG. 4, light-source light L1 emitted from the light source unit 31 propagates in a direction being away from the side surface 20s1 while being reflected by a back surface 10b of the substrate 10 and a front surface 20f of the substrate 20. In a propagation path of the light-source light L1, the back surface 10b of the substrate 10 and the front surface 20f of the substrate 20 are interfaces each between a medium having a large refractive index and a medium having a small refractive index. Thus, when an incident angle of the light-source light L1 incident on the front surface 20f and the back surface 10b is larger than an optimum angle, the light-source light L1 is totally reflected at the front surface 20f and the back surface 10b.

The liquid crystal LQ is polymer dispersed liquid crystal LC, and contains a liquid crystalline polymer and liquid crystal molecules. The liquid crystalline polymer is formed in stripes, and the liquid crystal molecules are dispersed in gaps of the liquid crystalline polymer. Each of the liquid crystalline polymer and the liquid crystal molecule has optical anisotropy or refractive anisotropy. The responsiveness of the liquid crystalline polymer to the electric field is lower than the responsiveness of the liquid crystal molecules to the electric field. The orientation direction of the liquid crystalline polymer hardly changes regardless of the presence or absence of the electric field. On the other hand, the orientation direction of the liquid crystal molecules changes in response to the electric field in a state where a high voltage equal to or higher than a threshold is applied to the liquid crystal LQ. In a state where the voltage is not applied to the liquid crystal LQ, the optical axes of the liquid crystalline polymer and the liquid crystal molecules are parallel to each other, and the light-source light L1 that has entered the liquid crystal layer LQL is hardly scattered in but transmitted through the liquid crystal layer LQL (transparent state). In a state where the voltage is applied to the liquid crystal LQ, the optical axes of the liquid crystalline polymer and the liquid crystal molecules intersect each other, and the light-source light L1 that has entered the liquid crystal LQ is scattered in the liquid crystal layer LQL (scattered state). In the display panel P1, the transparent state and the scattered state are controlled by controlling the orientation of the liquid crystal LQ in the propagation path of the light-source light L1. In the scattered state, by the liquid crystal LQ, the light-source light L1 is emitted, as emitted light L2, from the front surface 20f side to the outside of the display panel P1. Background light L3 that has entered the substrate 10 from the back surface 10b side is transmitted through the substrate 10, the liquid crystal layer LQL and the substrate 20, and is emitted from the front surface 20f to the outside. The emitted light L2 and the background light L3 are visually recognized by the observer on the front surface 20f side. The observer can recognize the combination of the emitted light L2 and the background light L3. Such a display panel that enables the observer to recognize the combination of the display image and the background is called a transparent display panel.

<Configuration Example of Circuit>

Figure 5:
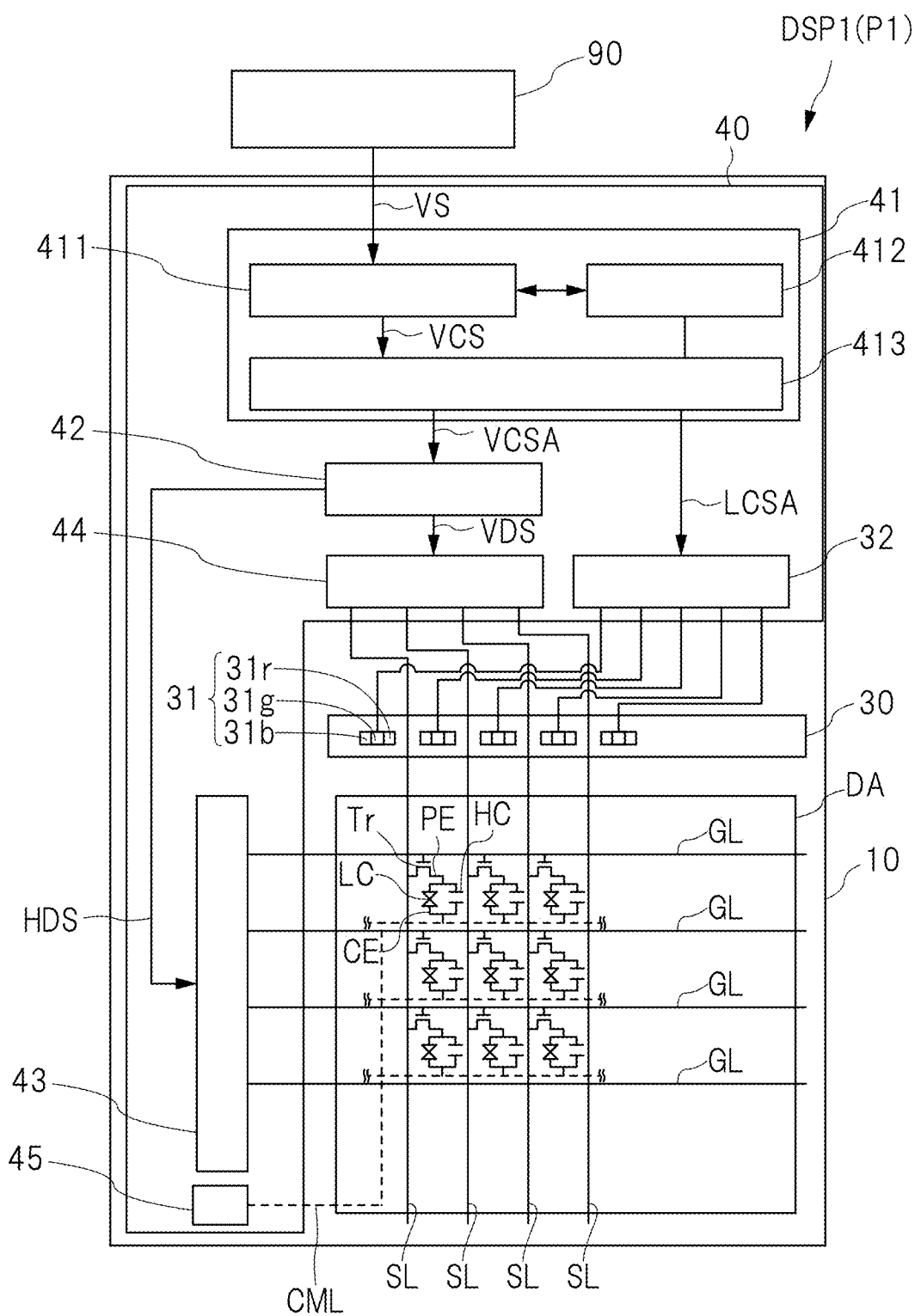
FIG. 5 is a circuit block diagram illustrating an example of a circuit included in the display panel of FIG. 3.

Next, a configuration example of the circuit included in the display panel P1 illustrated in FIG. 3 will be explained. FIG. 5 is a circuit block diagram illustrating an example of the circuit included in the display panel of FIG. 3. A wiring path connected to a common electrode CE illustrated in FIG. 5 is formed on, for example, the substrate 20 illustrated in FIG. 4. In FIG. 5, wirings formed on the substrate 20 are indicated by dotted lines. In the example illustrated in FIG. 5, a light source control unit 32 is included in the driving circuit 40. As a modification example, the light source control unit 32 may be provided separately from the driving circuit 40. The light source control unit 32 is formed on, for example, a wiring board (not illustrated) connected to the side light source apparatus 30 illustrated in FIG. 3, and is electrically connected to the light source unit 31 through this wiring board.

In the example illustrated in FIG. 5, the driving circuit 40 includes a signal processing circuit 41, a pixel control circuit 42, a gate driving circuit 43, a source driving circuit 44, and a common potential driving circuit 45. The light source unit 31 includes, for example, a red-light source unit 31r, a green-light source unit 31g, and a blue-light source unit 31b. Since the substrate 10 has a larger area than the substrate 20 as illustrated in FIG. 3, the driving circuit 40 and the side light source apparatus 30 are provided on the substrate 10.

The signal processing circuit 41 includes an input signal analyzing unit (input signal analyzing circuit) 411, a storage unit (storage circuit) 412, and a signal adjusting unit 413. The display panel P1 includes a control unit 90 including a control circuit that controls the image display. An input signal VS from the control unit 90 is input to the input signal analyzing unit 411 of the signal processing circuit 41 through a wiring path such as a flexible wiring board not illustrated. The input signal analyzing unit 411 performs an analyzing process on the basis of the input signal VS input thereto from the outside to generate an input signal VCS. The input signal VCS is, for example, a signal that determines, based on the input signal VS, a gradation value given to each pixel PIX (see FIG. 3) of the display panel P1 (see FIG. 3).

The signal adjusting unit 413 generates an input signal VCSA from the input signal VCS input thereto from the input signal analyzing unit 411. The signal adjusting unit 413 transmits the input signal VCSA to the pixel control circuit 42, and transmits a light source control signal LCSA to the light source control unit 32. The light source control signal LCSA is, for example, a signal containing information about light quantity of the light source unit 31 set in accordance with the gradation value input to the pixel PIX. For example, when a dark image is displayed, the light quantity of the light source unit 31 is set to be small. When a light image is displayed, the light quantity of the light source unit 31 is set to be large.

The pixel control circuit 42 generates a horizontal driving signal HDS and a vertical driving signal VDS on the basis of the input signal VCSA. For example, in the present embodiment, since a field sequential driving method is performed, the horizontal driving signal HDS and the vertical driving signal VDS are generated for each color, light of which can be emitted by the light source unit 31. The gate driving circuit 43 sequentially selects the gate lines GL of the display panel P1 (see FIG. 3) within one vertical scanning period on the basis of the horizontal driving signal HDS. A selection order of the gate lines GL is optional. As illustrated in FIG. 3, the plurality of gate lines (signal wirings) GL extend in the X direction, and are arrayed in the Y direction.

To each source line SL of the display panel P1 (see FIG. 3), the source driving circuit 44 feeds a gradation signal corresponding to an output gradation value of each pixel PIX (see FIG. 3) within one horizontal scanning period on the basis of the vertical driving signal VDS. As illustrated in FIG. 3, the plurality of source lines (signal wirings) SL extend in the Y direction, and are arrayed in the X direction. One pixel PIX is formed for each intersection between the gate lines GL and the source lines SL. The switching element Tr (see FIG. 5) is formed at each intersection between the gate lines GL and the source lines SL. The plurality of gate lines GL and source lines SL illustrated in FIGS. 3 and 5 correspond to the plurality of signal wirings that transmit the driving signals for driving the liquid crystal LQ illustrated in FIG. 4.

For example, a thin-film transistor is used as the switching element Tr illustrated in FIG. 5. The type of the thin-film transistor is not limited to any particular type, and, for example, the followings are exemplified: In classification based on a gate position, a bottom-gate transistor and a top-gate transistor are exemplified. Also, in classification based on the number of gates, a single-gate thin-film transistor and a double-gate thin-film transistor are exemplified. One of a source electrode and a drain electrode of the switching element Tr is connected to the source line SL, a gate electrode is connected to the gate line GL, and the other of the source electrode and the drain electrode is connected to one end of a capacitor of the polymer dispersed liquid crystal LC (the liquid crystal LQ illustrated in FIG. 4). One end of the capacitor of the polymer dispersed liquid crystal LC is connected to the switching element Tr though a pixel electrode PE, and the other end is connected to a common potential wiring CML through the common electrode CE. A holding capacitor HC is generated between the pixel electrode PE and a holding capacitor electrode electrically connected to the common potential wiring CML. Note that the common potential wiring CML is supplied by the common potential driving circuit 45.

<Display Apparatus Combined with Glass Plate>

Figure 6:
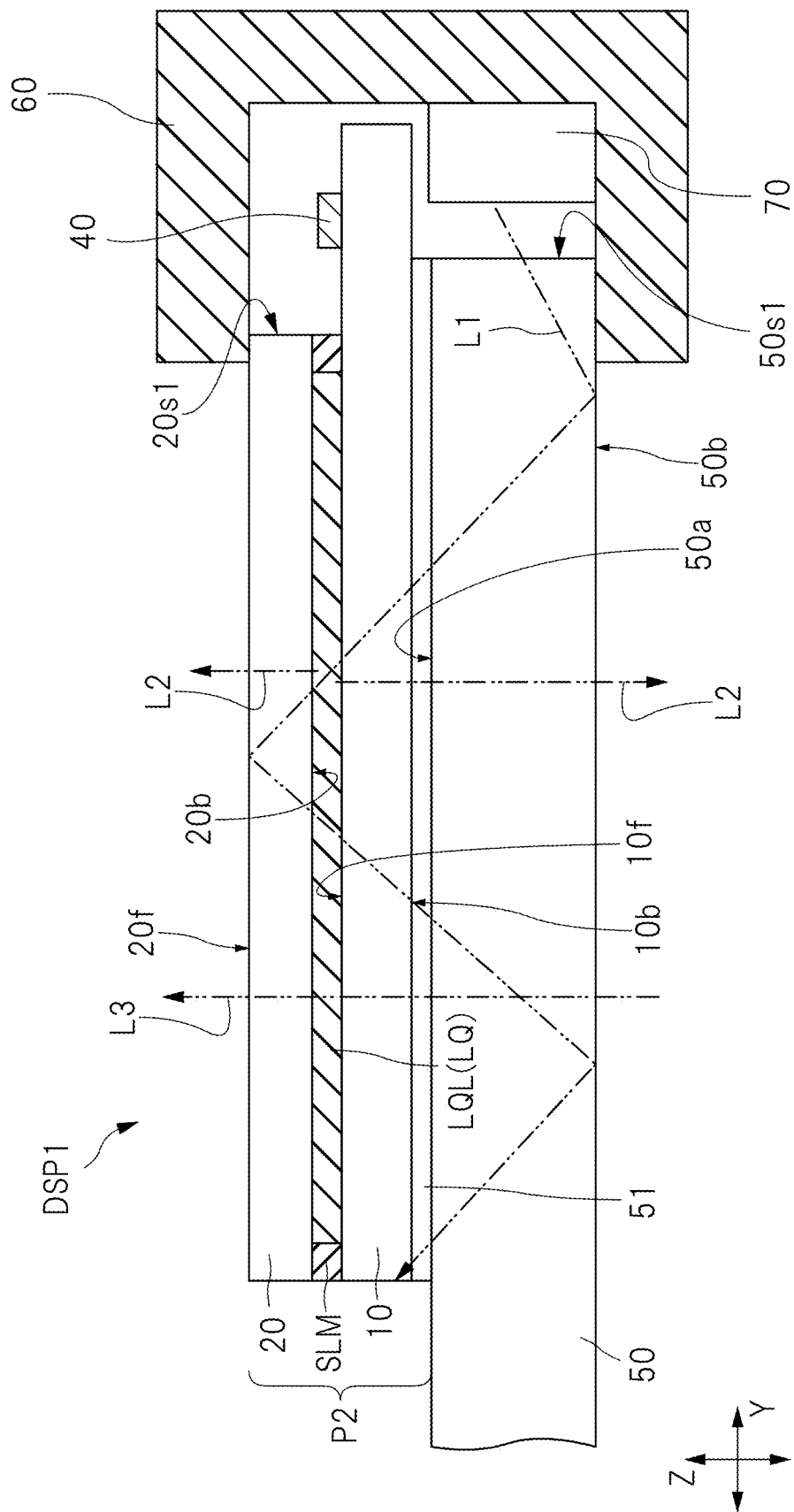
FIG. 6 is a cross-sectional view illustrating a configuration example of a display apparatus of an embodiment made of combination of a transparent display panel and a glass plate.
Figure 7:
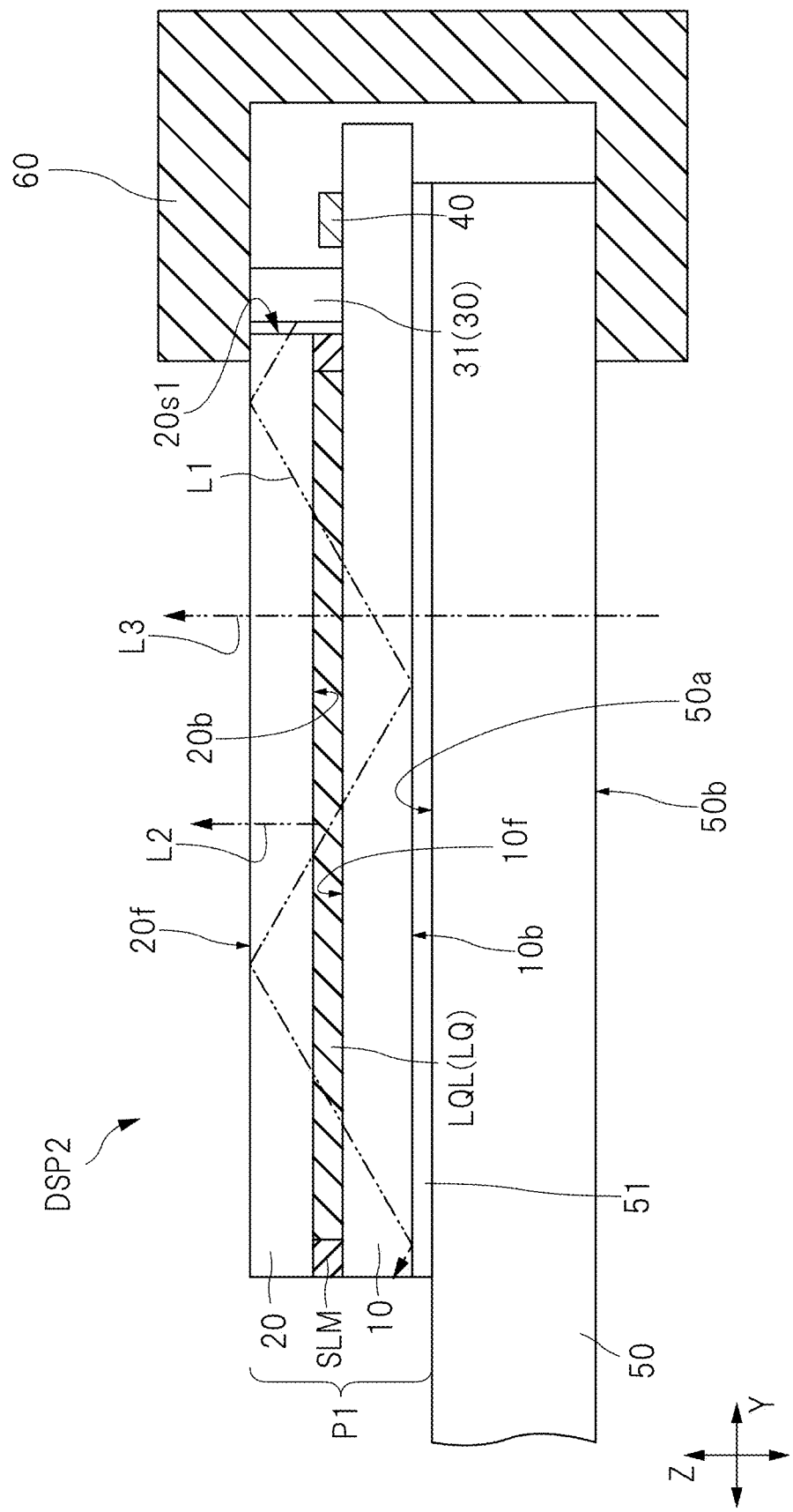
FIG. 7 is a cross-sectional view illustrating a study example with respect to FIG. 6.

Next, the structure of the display apparatus made of the combination of the transparent display panel and the glass plate explained above with reference to FIGS. 1 to 5 will be explained. FIG. 6 is a cross-sectional view illustrating a configuration example of the display apparatus of the present embodiment made of combination of the transparent display panel and the glass plate. FIG. 7 is a cross-sectional view illustrating a study example with respect to FIG. 6.

A display apparatus DSP1 illustrated in FIG. 6 differs from a display apparatus DSP2 illustrated in FIG. 7 in the following points. The display apparatus DSP2 illustrated in FIG. 7 has a structure made of simple combination of the display panel P1 and a glass plate 50 explained above with reference to FIGS. 1 to 5. On the other hand, a display panel P2 included in the display apparatus DSP1 illustrated in FIG. 6 does not include the side light source apparatus 30 illustrated in FIGS. 3 and 4. In addition, the display apparatus DSP1 differs from the display apparatus DSP2 in that the display apparatus DSP1 includes a light source module 70 housed in a frame 60.

The display apparatus DSP1 illustrated in FIG. 6 includes the glass plate 50, the display panel P2 facing the glass plate 50, the frame 60 housing a part of the glass plate 50 and a part of the display panel P2, and the light source module 70 housed in the frame 60 and disposed away from the display panel P2.

The case of the combination of the display panel P1 which is the transparent display panel and the glass plate 50 as in the display apparatus DSP2 illustrated in FIG. 7 has a problem that makes the display image difficult to see due to low luminance of the visible light output from the side light source apparatus 30. It is difficult to increase a size of the side light source apparatus 30 because the light needs to be allowed to enter the thin substrate 20 from the side surface 20s1. Thus, it is difficult to use a high-power LED element as a light source of the side light source apparatus 30.

On the other hand, in the display apparatus DSP1 of the present embodiment illustrated in FIG. 6, the light source module 70 is provided separately from the display panel P2. Specifically, the light source module 70 is housed inside the frame 60. Specifically, the glass plate 50 includes a surface 50a facing the display panel P2, a surface 50b opposite to the surface 50a, and a side surface 50s1 continuously formed from the surface 50a and the surface 50b. The display panel P2 includes a substrate 10 facing the glass plate 50, a substrate 20 facing the substrate 10, and a liquid crystal layer LQL located between the substrate 10 and the substrate 20. Inside the frame 60, the light source module 70 is disposed at a position facing the side surface 50s1 of the glass plate 50.

Light emitted from the light source module 70 is supplied to the display panel P2 through the glass plate 50. Specifically, the light (the light-source light L1) emitted from the light source module 70 is incident on the side surface 50s1 of the glass plate 50. The light-source light L1 propagates in a direction being away from the side surface 50s1 while being reflected by the surface 50b of the glass plate 50 and the front surface 20f of the substrate 20. In a propagation path of the light-source light L1, the surface 50b of the glass plate 50 and the front surface 20f of the substrate 20 are interfaces each between a medium having a large refractive index and a medium having a small refractive index. Thus, when an incident angle of the light-source light L1 incident on the front surface 20f and the surface 50b is larger than an optimum angle, the light-source light L1 is totally reflected at the front surface 20f and the surface 50b.

As described above, the orientation direction of the liquid crystal molecules varies depending on the electric field in a state where a high voltage equal to or higher than the threshold is applied to the liquid crystal LQ. In a state where the voltage is not applied to the liquid crystal LQ, the optical axes of the liquid crystalline polymer and the liquid crystal molecules are parallel to each other, and the light-source light L1 that has entered the liquid crystal layer LQL is hardly scattered and is transmitted in the liquid crystal layer LQL (transparent state). In a state where the voltage is applied to the liquid crystal LQ, the optical axes of the liquid crystalline polymer and the liquid crystal molecules intersect each other, and the light-source light L1 that has entered the liquid crystal LQ is scattered in the liquid crystal layer LQL (scattered state). The display panel P1 controls the transparent state and the scattered state by controlling the orientation of the liquid crystal LQ in the propagation path of the light-source light L1. In the scattered state, by the liquid crystal LQ, the light-source light L1 is emitted, as emitted light L2, from either one or both of the front surface 20f and the surface 50b to the outside of the display panel P1. Background light L3 that has entered from the surface 50b side is transmitted through the glass plate 50, the substrate 10, the liquid crystal layer LQL and the substrate 20, and is emitted to the outside from the front surface 20f. The emitted light L2 and the background light L3 are visually recognized by the observer on the front surface 20f side. The observer can recognize the combination of the emitted light L2 and the background light L3.

In the display apparatus DSP1, the light source module 70 is provided separately from the display panel P2. Thus, the size of the light source module 70 can be increased when being able to be housed inside the frame 60. The glass plate 50 is, for example, a window glass. The thickness of the glass plate 50 (the distance between the surface 50a and the surface 50b) is larger than the thickness of the substrate 20. The area of the side surface 50s1 of the glass plate 50 is larger than the area of the side surface 20s1 of the substrate 20. Thus, even when the light source module 70 is larger than the side light source apparatus 30 illustrated in FIG. 4, the light-source light L1 can be made incident on the side surface 50s1. Further, when the size of the light source module 70 can be increased, a high-power light source module can be selected as the light source module 70. That is, the display apparatus DSP1 includes the light source module 70 having a higher power than that of the side light source apparatus 30 illustrated in FIG. 7.

since the light source module 70 includes the high-power light source as described above, the luminance of the light-source light L1 emitted from the light source module 70 is higher than the luminance of the light-source light L1 output from the side light source apparatus 30 illustrated in FIG. 7. In this manner, since the high-luminance light source module 70 is provided separately from the display panel P2 in the display apparatus DSP1, the display image can be clearly recognized even in the case of the combination with the large glass plate 50 such as a window glass.

In terms of suppressing the reflection of the light-source light L1 between the glass plate 50 and the display panel P2, it is preferable to suppress the reflection of light-source light L1 at the surface 50a of the glass plate. In the example illustrated in FIG. 6, an adhesive layer 51 having a visible-light transmitting property is interposed between the glass plate 50 and the substrate 10, and the display panel P2 is bonded and fixed to the glass plate 50 to interpose the adhesive layer 51 therebetween. The refractive index of the adhesive layer 51 is closer to the refractive index of the glass plate 50 than the refractive index of air. Since the refractive index of the adhesive layer 51 is similar to the refractive index of the glass plate 50, the reflection of the light-source light L1 at the interfaces between the surface 50a of the glass plate 50 and the adhesive layer 51 and between the back surface 10b of the substrate 10 and the adhesive layer 51 can be suppressed. As examples of the adhesive layer 51 having the same level of refractive index as that of the glass plate 50, a transparent adhesive sheet formed in a sheet shape called an optical clear adhesive (OCA), an optical clear resin (OCR) using a hardened liquid transparent adhesive and others are exemplified.

<Heat Dissipation Measures in Light Source Module>

Figure 8:
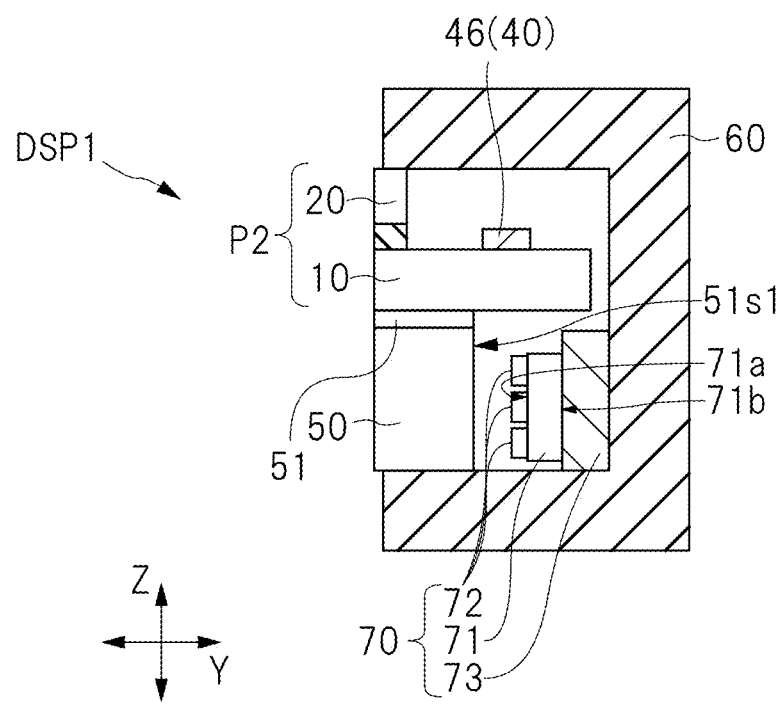
FIG. 8 is an enlarged cross-sectional view illustrating a light source module and surroundings thereof illustrated in FIG. 6 to be enlarged.

Next, heat dissipation measures in the light source module 70 illustrated in FIG. 6 will be explained. FIG. 8 is an enlarged cross-sectional view illustrating the light source module and the surrounding thereof illustrated in FIG. 6 to be enlarged. The high-power light source module 70 illustrated in FIG. 6 can output high-luminance light, but generates a large amount of heat. Thus, in order to stabilize the operation of the light source module 70 and the display panel P2 to improve the reliability of the display apparatus DSP1, it is preferable to take measures to dissipate heat generated from the light source module 70.

As illustrated in FIG. 8, the light source module 70 includes a substrate 71, and a plurality of LED elements 72 mounted on the substrate 71. The substrate 71 of the light source module 70 is bonded and fixed to the frame 60 to interpose a heat dissipation sheet 73 having an electrical insulation property therebetween. The heat dissipation sheet 73 has a higher thermal conductivity than each of those of the glass plate 50, the substrate 10, and the substrate 20. The heat dissipation sheet 73 contains, for example, an adhesive component that bonds the frame 60 and the substrate 71 together, and a heat dissipation filler made of a material having high thermal conduction property, such as metal particles. The frame 60 can also be made of a resin material or the like. However, in terms of improving the heat dissipation property of the frame 60 itself, the material of the frame 60 preferably contains a metal material. As described later, the frame 60 is, for example, a window frame, and the heat generated from the light source module 70 can be widely dissipated when the window frame 60 surrounds the whole circumference of the side surface 50s1 of the window glass 50.

The plurality of LED elements 72 include, for example, a red LED element that emits visible light in a frequency band of a red color, a green LED element that emits visible light in a frequency band of a green color, and a blue LED element that emits visible light in a frequency band of a blue color. The substrate 71 is a wiring board on which a circuit electrically connected to each of the plurality of LED elements 72 is formed. Each of the plurality of LED elements 72 is electrically connected to a control circuit (not illustrated) that controls the operation of the light source module 70 through the substrate 71 which is the wiring board. The substrate 71 has a surface 71a and a surface 71b opposite to the surface 71a. Each of the plurality of LED elements 72 is mounted on the surface 71a of the substrate 71. The heat dissipation sheet 73 is bonded to the surface 71b of the substrate 71.

Figure 9:
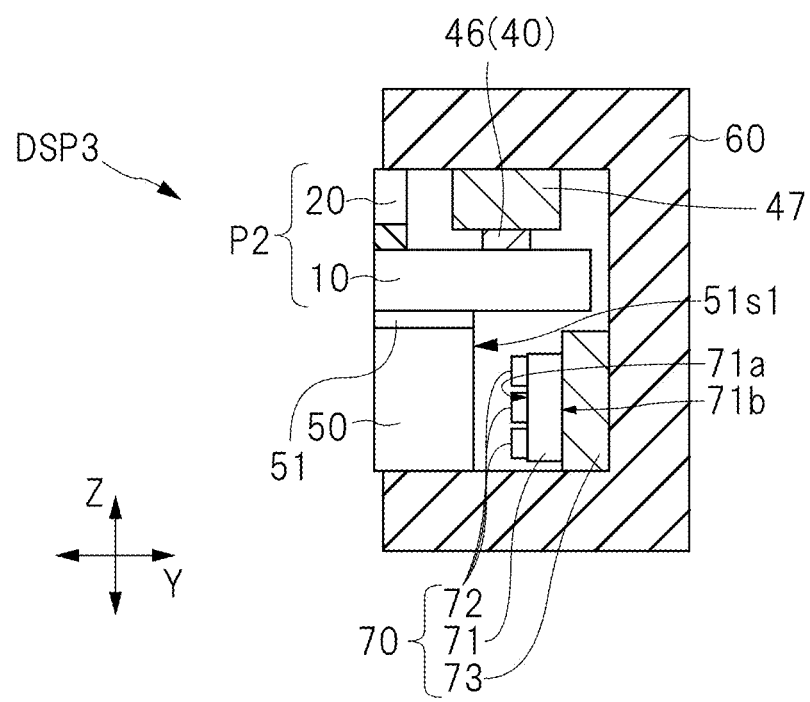
FIG. 9 is an enlarged cross-sectional view illustrating a modification with respect to FIG. 8.

FIG. 9 is an enlarged cross-sectional view illustrating a modification with respect to FIG. 8. A display apparatus DSP3 illustrated in FIG. 9 differs from the display apparatus DSP1 illustrated in FIG. 8 in the following points. The display panel P2 is mounted on the substrate 10 and further includes an electronic component 46 including a driving circuit 40 that drives the liquid crystal layer LQL (see FIG. 6). A heat dissipation sheet 47 having an electrical insulation property is bonded and fixed between the electronic component 46 and the frame 60. The heat dissipation sheet 47 has a higher thermal conductivity than each of those of the glass plate 50, the substrate 10 and the substrate 20.

The electronic component 46 is, for example, a driver IC including the driving circuit 40 formed thereon. The light source module 70, which generates a large amount of heat, is disposed inside the frame 60, and, a higher power supply voltage than that of the liquid crystal used in a smartphone or others is required to drive the polymer dispersed liquid crystal LC. Thus, in terms of stabilizing the operation of the driving circuit 40, it is preferable to also take the heat dissipation measures for the electronic component 46 including the driving circuit 40 formed thereon. The heat dissipation sheet 47 contains, for example, an adhesive component that bonds the frame 60 and the electronic component 46 together, and a heat dissipation filler made of a material having high thermal conduction property, such as metal particles. In the display apparatus DSP3, the electronic component 46 is thermally connected to the frame 60 to interpose the heat dissipation sheet 47 therebetween. This manner can improve the operation stability of the electronic component 46.

<Modification Example of Application to Double Glass>

Figure 10:
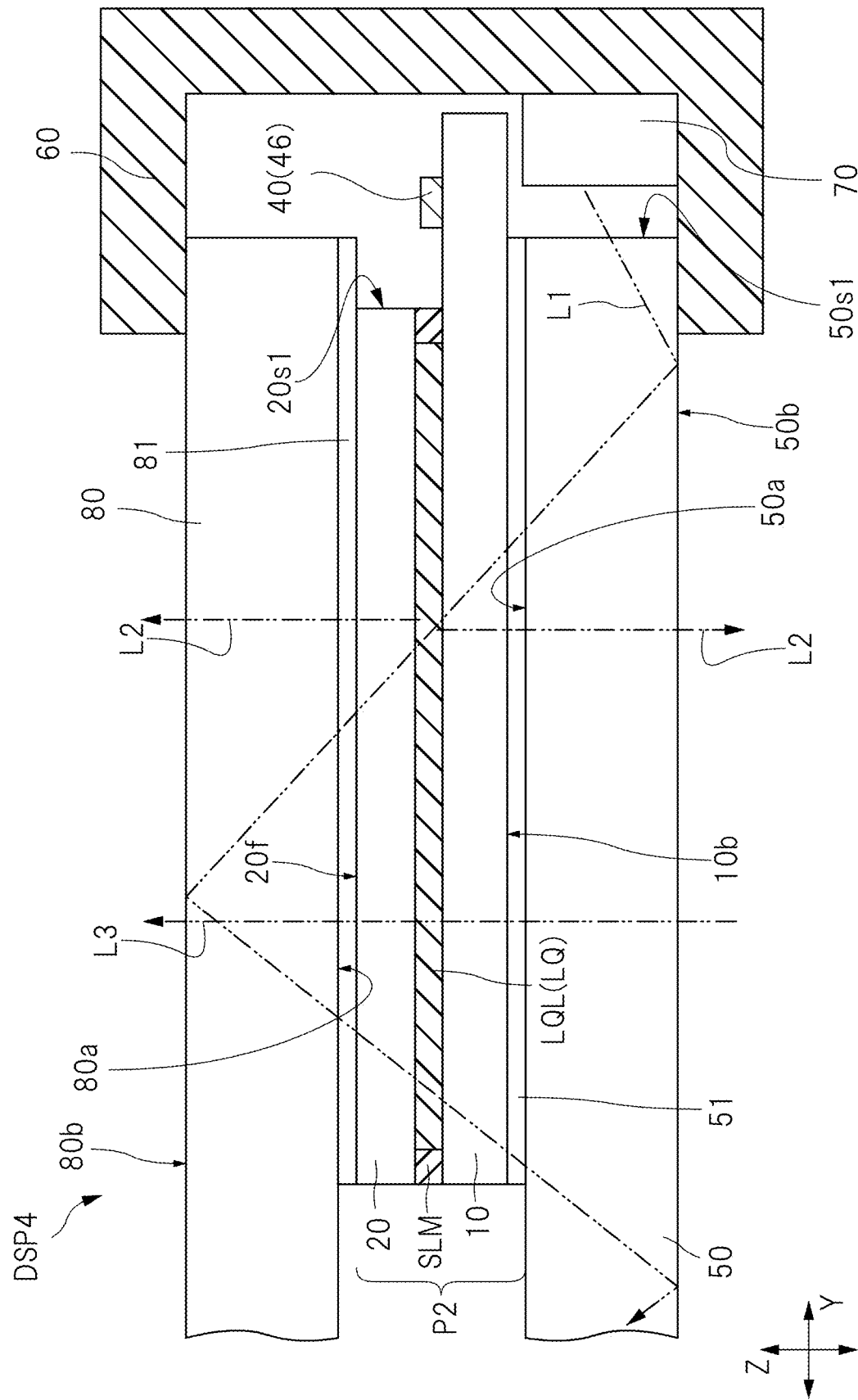
FIG. 10 is a cross-sectional view illustrating a modification with respect to the display apparatus illustrated in FIG. 6.

Next, as a modification example with respect to the display apparatus illustrated in FIG. 6, an embodiment of combination of the display panel P2 and a double glass will be explained. FIG. 10 is a cross-sectional view illustrating a modification example with respect to the display apparatus illustrated in FIG. 6. A display apparatus DSP4 illustrated in FIG. 10 differs from the display apparatus DSP1 illustrated in FIG. 6 in the following points. The display apparatus DSP4 further includes a glass plate 80 in addition to the glass plate 50. A part of the glass plate 80 is housed in the frame 60. The liquid crystal layer LQL of the display panel P2 is disposed between the glass plate 50 and the glass plate 80. The glass plate 80 has a surface 80a facing the substrate 20, and a surface 80b opposite to the surface 80a.

The display apparatus DSP4 has a double glass structure including the two glass plates (the glass plate 50 and the glass plate 80) spaced from each other. The technique described above is also applicable to the double glass structure. The glass plate 50 and the glass plate 80 are disposed to interpose the display panel P2 therebetween, and thus, also function as protection members that protect the display panel P2. For example, the glass plate 80 is a window glass having the same size as the glass plate 50, and the frame 60 is a window frame surrounding the whole circumference of the side surface of the glass plate 80 and the side surface of the glass plate 50.

Also in the double glass structure as seen in the display apparatus DSP4, the operation of the display panel P2 is the same. That is, the light source module 70 is disposed at a position facing the side surface 50s1 of the glass plate 50, and the light-source light L1 is made incident from the side surface 50s1 of the glass plate 50. Accordingly, the size of the LED element 72 (see FIG. 8) used in the light source module 70 can be increased. Thus, a high-luminance light source can be selected.

Also, as described above with reference to FIG. 6, in terms of suppressing the reflection of the light-source light L1 between the glass plate 50 and the display panel P2, it is preferable to suppress the reflection of light-source light L1 at the surface 50a of the glass plate. In the example illustrated in FIG. 10, the adhesive layer 51 having a visible-light transmitting property is interposed between the glass plate 50 and the substrate 10, and the display panel P2 is bonded and fixed to the glass plate 50 to interpose the adhesive layer 51 therebetween. The refractive index of the adhesive layer 51 is closer to the refractive index of the glass plate 50 than the refractive index of air. Since the refractive index of the adhesive layer 51 is similar to the refractive index of the glass plate 50, the reflection of the light-source light L1 at the interfaces between the surface 50a of the glass plate 50 and the adhesive layer 51 and between the back surface 10b of the substrate 10 and the adhesive layer 51 can be suppressed. As examples of the adhesive layer 51 having the same level of the refractive index as that of the glass plate 50, a transparent adhesive sheet formed in a sheet shape called an optical clear adhesive (OCA), an optical clear resin (OCR) using a hardened liquid transparent adhesive and others are exemplified.

On the other hand, on the substrate 20 side, even if the light-source light L1 is totally reflected by the front surface 20f of the substrate 20, the light-source light L1 travels in an optical path similar to that in FIG. 6. Thus, there is no particular problem. However, in the example illustrated in FIG. 10, an adhesive layer 81 having a visible-light transmitting property is interposed between the glass plate 80 and the substrate 20, and the substrate 20 of the display panel P2 is bonded and fixed to the glass plate 80 to interpose the adhesive layer 81 therebetween. In this case, it is preferable to suppress the refraction of the light-source light L1 in the adhesive layer 81. Thus, the refractive index of the adhesive layer 81 is closer to the glass plate 80 than the refractive index of air. Since the refractive index of the adhesive layer 81 is similar to the refractive index of the glass plate 80, the reflection of the light-source light L1 at the surface 80a of the glass plate 80 or the refraction of the light-source light L1 at the adhesive layer 81 can be suppressed. Examples of the adhesive layer 81 are the same as the examples of the adhesive layer 51.

Figure 11:
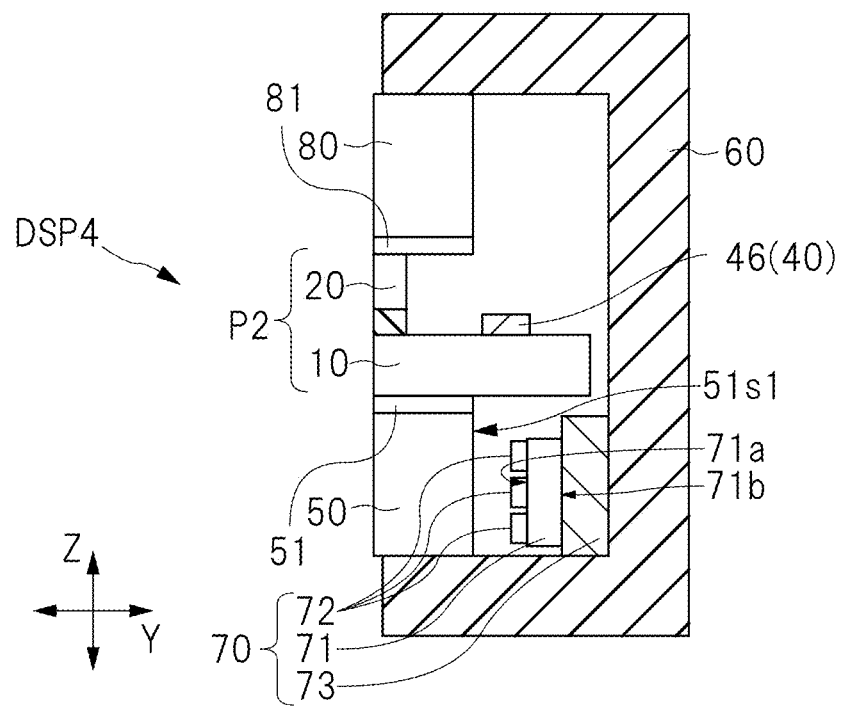
FIG. 11 is an enlarged cross-sectional view illustrating a light source module and surroundings thereof illustrated in FIG. 10 to be enlarged.

Next, heat dissipation measures in the embodiment of the combination with the double glass as seen in the display apparatus DSP4 illustrated in FIG. 10 will be explained. FIG. 11 is an enlarged cross-sectional view illustrating the light source module and the surroundings thereof illustrated in FIG. 10 to be enlarged. The embodiment of the combination with the double glass is also the same as the display apparatus DSP1 illustrated in FIG. 6 in that the light source module 70 generates the large amount of heat. Thus, it is preferable to take the heat dissipation measures for the light source module 70.

As illustrated in FIG. 11, the light source module 70 includes a substrate 71, and a plurality of LED elements 72 mounted on the substrate 71. The substrate 71 of the light source module 70 is bonded and fixed to the frame 60 to interpose a heat dissipation sheet 73 having an electrical insulation property therebetween. The heat dissipation sheet 73 has a higher thermal conductivity than each of those of the glass plate 50, the substrate 10 and the substrate 20. Each of the substrate 71, the plurality of LED elements 72, and the heat dissipation sheet 73 is as described above with reference to FIG. 8, and repetitive explanation thereof will thus be omitted. The frame 60 can also be made of a resin material or the like. However, in terms of improving the heat dissipation property of the frame 60 itself, the material of the frame 60 preferably contains a metal material. This point is also the same as that of the frame 60 described above with reference to FIG. 8.

Figure 12:
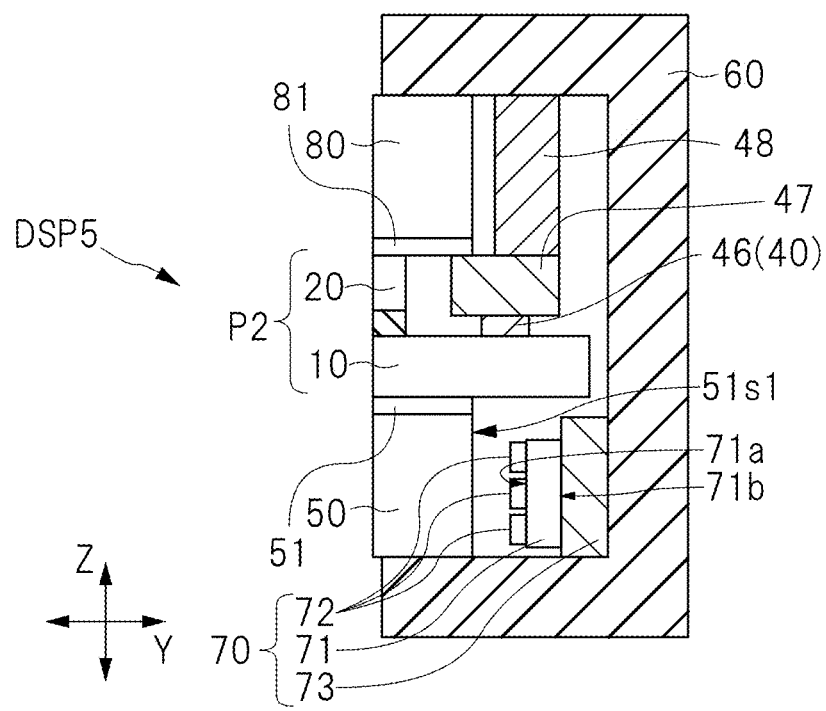
FIG. 12 is an enlarged cross-sectional view illustrating a modification with respect to FIG. 8.

FIG. 12 is an enlarged cross-sectional view illustrating a modification example with respect to FIG. 11. A display apparatus DSP5 illustrated in FIG. 12 differs from the display apparatus DSP4 illustrated in FIG. 10 in the following points. The display panel P2 is mounted on the substrate 10 and further includes an electronic component 46 including a driving circuit 40 that drives the liquid crystal layer LQL (see FIG. 10). A heat dissipation sheet 47 having an electrical insulation property is bonded and fixed between the electronic component 46 and the frame 60. The heat dissipation sheet 47 has a higher thermal conductivity than each of those of the glass plate 50, the glass plate 80, the substrate 10 and the substrate 20.

The electronic component 46 is, for example, a driver IC including the driving circuit 40 formed thereon. The light source module 70, which generates a large amount of heat, is disposed inside the frame 60, and a higher power supply voltage than that of liquid crystal used in, for example, a smartphone or others is required to drive the polymer dispersed liquid crystal LC. Thus, in terms of stabilizing the operation of the driving circuit 40, it is preferable to also take the heat dissipation measures for the electronic component 46 including the driving circuit 40 formed thereon. The heat dissipation sheet 47 contains, for example, an adhesive component that bonds the frame 60 and the electronic component 46 together, and a heat dissipation filler made of a material having high thermal conduction property, such as metal particles. In the display apparatus DSP5, the electronic component 46 is thermally connected to the frame 60 to interpose the heat dissipation sheet 47 therebetween. This manner can improve the operation stability of the electronic component 46.

Incidentally, in the example illustrated in FIG. 12, the heat dissipation sheet 73 is directly stuck to the frame 60, and a metal plate 48 is interposed between the heat dissipation sheet 47 and the frame 60. In other words, in the example illustrated in FIG. 12, the electronic component 46 is thermally connected to the frame 60 to interpose the heat dissipation sheet 47 and the metal plate 48 therebetween. In the case of the application to the display apparatus having the double glass structure, a part of each of the two large glass plates made of the glass plate 50 and the glass plate 80 is housed inside the frame 60. Thus, a separation distance between the frame 60 and the electronic component 46 may be larger than that in the example illustrated in FIG. 9. In such a case, connecting the electronic component 46 and the frame 60 only by the heat dissipation sheet is not indispensable, and a heat dissipation member such as the metal plate 48 can be used in addition to the heat dissipation sheet 47.

Figure 13:
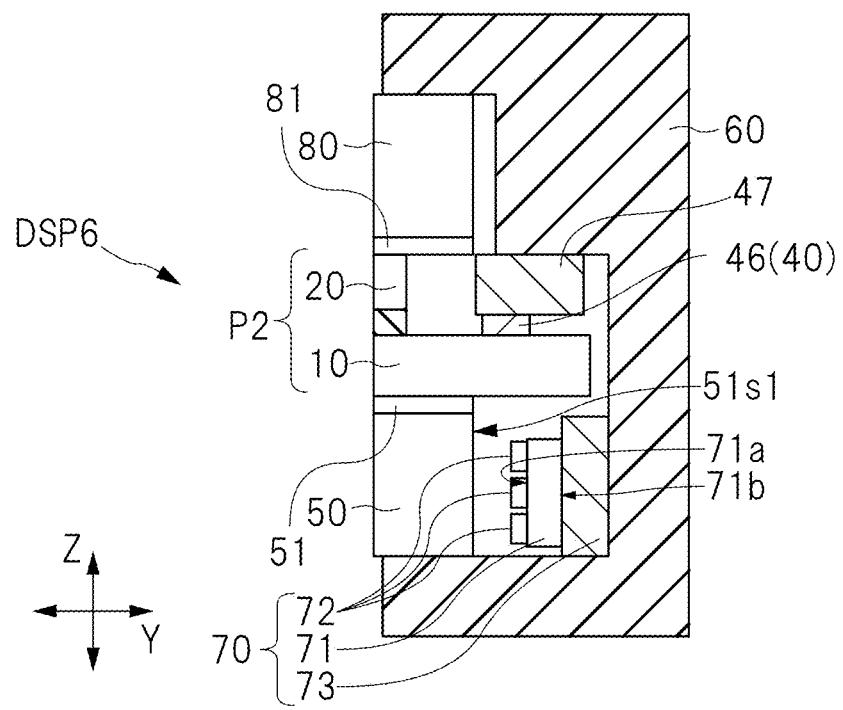
FIG. 13 is an enlarged cross-sectional view illustrating a modification with respect to FIG. 12.

FIG. 13 is an enlarged cross-sectional view illustrating a modification example with respect to FIG. 12. A display apparatus DSP6 illustrated in FIG. 13 differs from the display apparatus DSP5 illustrated in FIG. 12 in the following points. Each of a heat dissipation sheet 73 and a heat dissipation sheet 47 of display apparatus DSP6 is directly stuck to a frame 60. In the display apparatus DSP6 illustrated in FIG. 13, the shape of the frame 60 differs from that in the display apparatus DSP5 illustrated in FIG. 12. That is, a part of the frame 60, the part covering the electronic component 46, protrudes toward the electronic component 46. In this case, even in the case of the combination with the double glass structure, the separation distance between the electronic component 46 and the frame 60 can be reduced. Thus, the heat dissipation sheet 47 can be directly stuck to both the electronic component 46 and the frame 60.

<Usage Examples of Display Apparatus>

Figure 14:
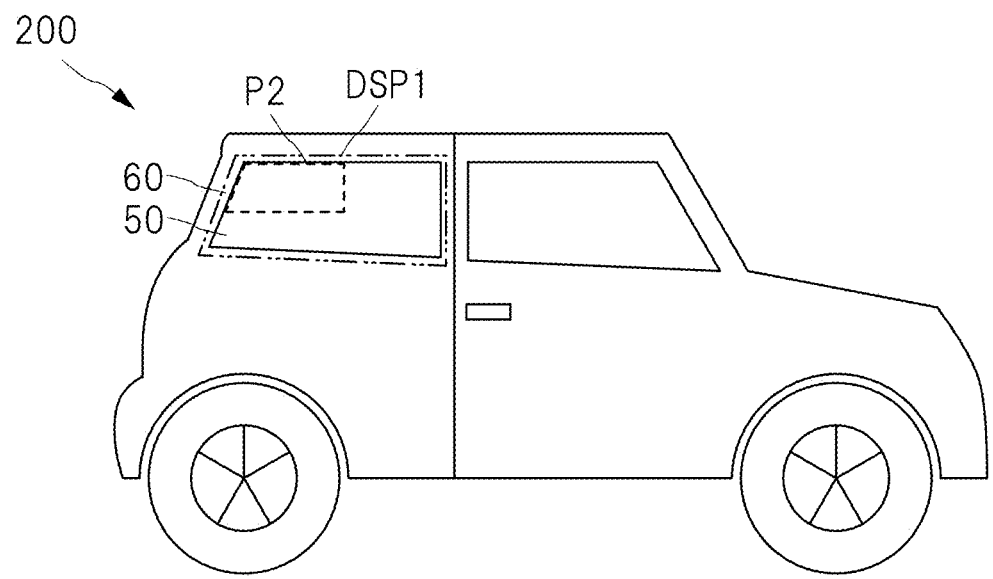
FIG. 14 is a side view of an automobile as a usage example of the display apparatus explained with reference to FIGS. 1 to 13.
Figure 15:
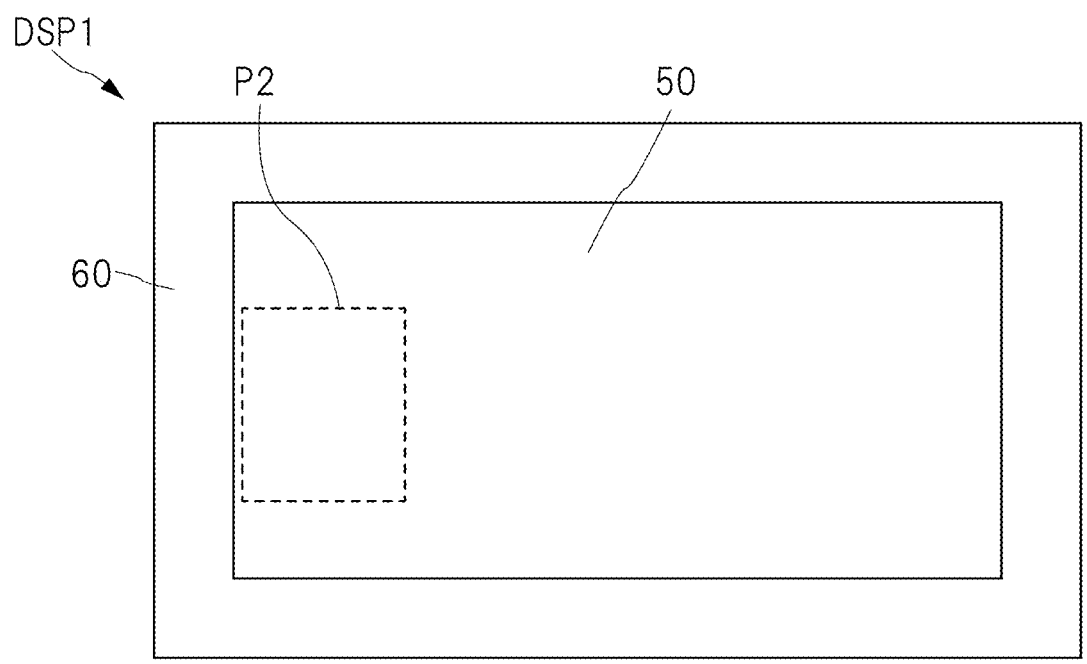
FIG. 15 is a side view of a building window as another usage example other than the example of FIG. 14.

Next, usage examples of the display apparatuses described above with reference to FIGS. 1 to 13 will be explained. FIG. 14 is a side view of an automobile as the usage example of the display apparatus described above with reference to FIGS. 1 to 13. FIG. 15 is a side view of a building window as another usage example other than the example of FIG. 14.

In the usage example illustrated in FIG. 14, the display apparatus DSP1 is applied to one of a plurality of windows included in an automobile 200. The glass plate 50 is, for example, an automobile window glass. The frame 60 corresponds to a part of a frame of the automobile 200. In the usage example illustrated in FIG. 14, the display panel P2 is disposed at a position overlapping a part of the glass plate 50. When an image is displayed on the display panel P2, this image can be visually recognized from the outside of the automobile 200 and can also be visually recognized from the inside of the automobile 200. In the example illustrated in FIG. 14, power that drives the display apparatus DSP1 is supplied through a power supply path housed in the frame of the automobile 200.

In the usage example illustrated in FIG. 15, the display apparatus DSP1 is applied to a window included in a building such as a house. The glass plate 50 is a building window glass. The frame 60 is a building window frame. In the usage example illustrated in FIG. 15, the display panel P2 is disposed at a position overlapping a part of the glass plate 50. When an image is displayed on the display panel P2, this image can be visually recognized from the outside of the building and can also be visually recognized from the inside of the building. In the example illustrated in FIG. 15, power that drives the display apparatus DSP1 is supplied through a power supply path housed in the frame 60 although not illustrated.

FIGS. 14 and 15 illustrate the usage examples of the display apparatus DSP1 illustrated in FIG. 6 as one example. However, the display apparatus DSP1 illustrated in FIGS. 14 and 15 can be replaced with the display apparatus DSP3 illustrated in FIG. 9, the display apparatus DSP4 illustrated in FIG. 10, the display apparatus DSP5 illustrated in FIG. 12, or the display apparatus DSP6.

The embodiments and the typical modification examples have been described above. However, the above-described technique is applicable to various modification examples other than the exemplified modification examples. For example, the above-described modification examples may be combined with each other.

Various modification examples and alternation examples within the scope of the concept of the present invention can be easily anticipated by those who are skilled in the art, and it would be understood that these modification examples and alternation examples also belong to the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the concept of the present invention.

The present invention is applicable to a display apparatus and electronic equipment to which the display apparatus is embedded.

What is claimed is:

1. A display apparatus comprising:
a first glass plate;
a second glass plate;
a display panel facing the first glass plate;
a frame housing a part of the first glass plate, a part of the second glass plate, and a part of the display panel; and
a light source module housed in the frame and disposed away from the display panel,
wherein the first glass plate has a first surface, a second surface opposite to the first surface, and a first side surface continuously formed from the first surface and the second surface,
light emitted from the light source module is made incident on the first side surface of the first glass plate,
the display panel includes
a first substrate facing the first glass plate,
a second substrate facing the first substrate, and
a liquid crystal layer located between the first substrate and the second substrate,
the liquid crystal layer of the display panel is disposed between the first glass plate and the second glass plate,
the light source module is disposed at a position facing the first side surface of the first glass plate,
the light source module includes a third substrate, and a plurality of LED elements mounted on the third substrate,
the third substrate of the light source module is bonded and fixed to the frame to interpose a first heat dissipation sheet having an electrical insulation property therebetween,
the first heat dissipation sheet has a higher thermal conductivity than each of thermal conductivities of the first glass plate, the first substrate and the second substrate,
the display panel further includes a first electronic component mounted on the first substrate and including a driving circuit configured to drive the liquid crystal layer,
a second heat dissipation sheet having an electrical insulation property is bonded and fixed between the first electronic component and the frame,
the second heat dissipation sheet has a higher thermal conductivity than each of thermal conductivities of the first glass plate, the first substrate and the second substrate,
the first heat dissipation sheet is directly stuck to the frame, and
a metal plate is interposed between the second heat dissipation sheet and the frame.

2. The display apparatus according to claim 1,
wherein a first adhesive layer having a visible-light transmitting property is interposed between the first glass plate and the first substrate, and the first substrate is bonded and fixed to the first glass plate to interpose the first adhesive layer therebetween,
a second adhesive layer having a visible-light transmitting property is interposed between the second glass plate and the second substrate, and the second substrate is bonded and fixed to the second glass plate to interpose the second adhesive layer therebetween,
a refractive index of the first adhesive layer is closer to a refractive index of the first glass plate than a refractive index of air, and a refractive index of the second adhesive layer is closer to a refractive index of the second glass plate than the refractive index of air.

3. The display apparatus according to claim 1, wherein each of the first glass plate and the second glass plate is a window glass, and the frame is a window frame.

* * * * *